J. F. & H. E. DODGE.
FOOT REST.
APPLICATION FILED AUG. 31, 1915.
1,181,118.
Patented May 2, 1916.
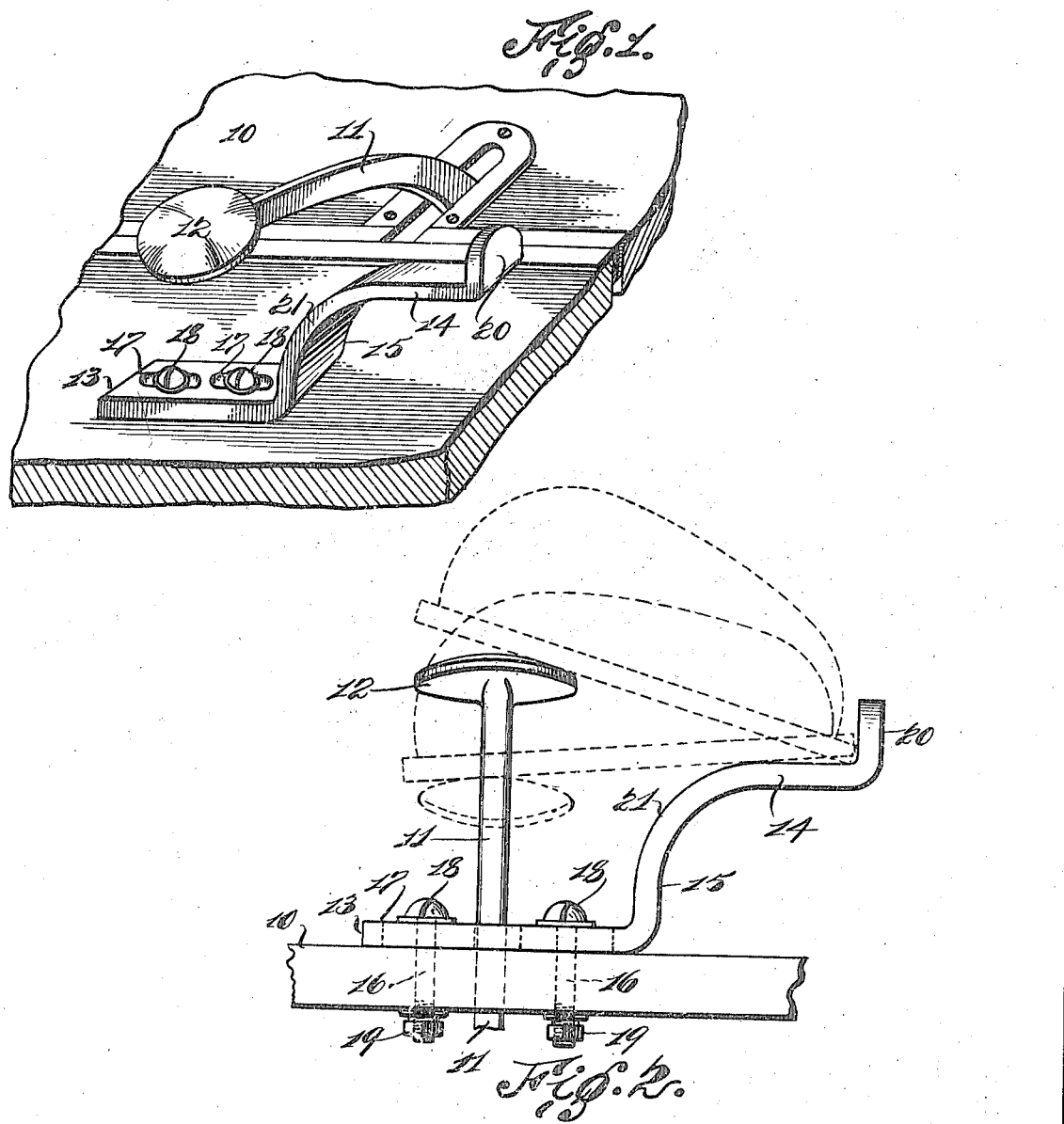

UNITED STATES PATENT OFFICE.

JOHN F. DODGE, OF DETROIT, AND HORACE E. DODGE, OF GROSSE POINTE, MICHIGAN, ASSIGNORS TO DODGE BROTHERS, OF DETROIT, MICHIGAN, A CORPORATION OF MICHIGAN.

FOOT-REST.

1,181,118.

Specification of Letters Patent.

Patented May 2, 1916.

Application filed August 31, 1915. Serial No. 48,190.

*To all whom it may concern:*

Be it known that we, JOHN F. DODGE and HORACE E. DODGE, citizens of the United States, residing at Detroit, Michigan, and Grosse Pointe, Michigan, respectively, have invented certain new and useful Improvements in Foot-Rests, of which the following is a clear, full, and exact description.

This invention relates to foot-rests, more particularly adapted for use in connection with the accelerator pedals used in automobiles for controlling the throttle.

One of the objects of the invention is to provide an adjustable foot-rest, and another to provide a foot-rest such that the foot is supported from the time the accelerator pedal is started downward until the completion of its stroke.

Other objects are to provide a simple, practical and efficient foot-rest which may be used in connection with accelerator pedals.

These being among the objects of the present invention, the same consists of certain features of construction and combinations of parts to be hereinafter described and then claimed with reference to the accompanying drawings illustrating a desirable embodiment of the invention, and in which—

Figure 1 is a perspective view of a portion of the floor of the car body, an accelerator pedal and a foot-rest; and Fig. 2 is an elevation of the same parts, showing the operator's foot in dotted lines in two positions.

Through the floor 10 of an automobile projects a lever 11 provided with a head 12 which constitutes an accelerator pedal for operating the throttle. Located with reference to said pedal, preferably in the position shown, is a bracket comprising a foot 13 connected with an elevated foot-rest portion 14 by an upright portion or shank 15. Said bracket is attached to the floor or other support 10, by means of through bolts 16 which pass through slots 17 in the foot 13 of said bracket, and said bolts are provided with heads 18 which rest upon foot 13. The lower ends of said bolts receive nuts 19 whereby said bolts may be tightened up. As shown, the foot 13 is positioned underneath the free end of the accelerator pedal so that the elevated foot-rest portion 14 extends in horizontal position laterally of the pedal and is preferably located at a slight distance below the upper position of said pedal. The distance between the free end of the accelerator pedal and the foot-rest portion 14 is such that the edges of the sole of the operator's shoe may rest simultaneously upon said foot-rest portion 14 and the pedal 12. In order to secure this position of the operator's foot, a stop 20 extends upwardly from the outer end of the foot-rest portion 14. Said stop 20 provides a lateral abutment for the side of the operator's shoe. Between the foot rest portion 14 and the upright portion 15, the foot-rest bracket is curved as at 21, this curve extending downwardly from the foot-rest portion 14 and being located intermediately of the stop 20 and the accelerator pedal.

Two positions of the operator's foot are shown in dotted lines in Fig. 2. In the upward position of the foot, one edge portion of the operator's shoe will rest upon the accelerator pedal 12 while it will be inclined downwardly toward the foot-rest portion 14 with the outer edge thereof resting against the stop 20. In the downward position shown in dotted lines, the accelerator pedal is shown in its normal working position with the foot substantially level. It will be seen that the accelerator pedal is operated by a rolling movement of the foot upon the rest, from the upper to the lower position, and that the sole of the shoe is supported at all times by the foot-rest. This is facilitated by the rounding or curving of the foot-rest at 21.

The improved foot-rest is preferably composed of a single metal stamping extending, as shown, transversely of the accelerator pedal, the slots 17 extending longitudinally of the foot-rest so as to provide for a longitudinal adjustment thereof. Such adjustment enables the rest to accommodate different widths of shoes.

Obviously this invention comprises any desirable modifications.

What we claim as new is:—

1. In combination, a movable pedal, a support, a bracket having a foot-rest portion at one side of and extending away from said pedal, a stop on said foot-rest portion for engagement by the side of an operator's shoe, said bracket having at the inner end of said foot-rest portion a broad sweeping, downward curve, and the breadth of said foot-rest portion being approximately one-fourth to one-third of the width of an operator's shoe, such that said shoe may have a sidewise pivoting on said foot-rest portion and curve so as to be inclined upwardly from said stop and downwardly upon said curve when said foot-rest is in use, a foot on said bracket, and means for connecting said foot and support for the adjustment of said bracket on said support in the direction in which said foot-rest portion is extended from said pedal.

2. In combination, a movable pedal, a foot-rest having a relatively broad foot-supporting surface, said foot-rest also having a broad sweeping, downward curve between said pedal and surface, means for mounting said foot-rest to one side of said pedal so that said surface extends away from the said pedal, and a stop for a side edge of an operator's shoe, the breadth of said surface being substantially one-fourth to one-third of the width of an operator's shoe, and the height of the said surface and the upper surface of said pedal being such that the operator's shoe may have a sidewise pivoting on said foot-supporting surface and curve so as to be inclined upwardly from said stop and downwardly upon said curve when said pedal is operated.

3. In combination, a movable pedal, a foot-rest located to one side of said pedal and having a stop for a side edge of the pedal operator's shoe, and means for adjustably mounting said foot-rest for lateral adjustment relatively to said pedal.

4. In combination, an accelerator pedal for an automobile, a bracket located to one side of said pedal and having a foot and above the said foot a foot-rest portion, a stop at that end of the latter which is remote from said pedal, said foot being slotted in a direction laterally of said pedal, and a fastening passing through said slot and the floor of the car, for adjusting said bracket laterally of and relatively to said pedal.

5. In combination, an accelerator pedal for an automobile, a bracket located to one side of said pedal and having a foot and above the said foot a foot-rest portion, a stop at that end of the latter which is remote from said pedal, said foot-rest having a broad sweeping down curve between said pedal and stop, said foot being slotted in a direction laterally of said pedal, and a fastening passing through said slot and the floor of the car, for adjusting said bracket laterally of and relatively to said pedal.

6. In combination, a movable pedal and a foot-rest, alongside of said pedal, and having a laterally extending relatively broad foot-supporting surface with an inwardly located curvature, said curvature having a broad sweep downwardly for a rolling bearing of the pedal-operator's foot, whereby the operator's foot may have a sidewise pivoting on said foot-supporting surface and curvature and assume an upward and a downward inclined position with respect to said surface.

7. In combination, a movable pedal, a support, a bracket having a foot-rest portion at one side of and extending away from said pedal, a stop on said foot-rest portion for engagement by the side of an operator's shoe, said bracket having at the inner end of said foot-rest portion a broad sweeping, downward curve and the breadth of said foot-rest portion being approximately one-fourth to one-third of the width of an operator's shoe, such that said shoe may have a sidewise pivoting on said foot-rest portion and curve so as to be inclined upwardly from said stop and downwardly upon said curve when said foot-rest is in use, a foot on said bracket, and means for connecting said foot with said support.

Signed at Detroit, Mich., this 28th day of August, 1915.

JOHN F. DODGE.
HORACE E. DODGE.

Witnesses:
W. M. McPherson,
Alfred H. Knight.